(12) United States Patent
Lamberton et al.

(10) Patent No.: US 6,925,465 B2
(45) Date of Patent: Aug. 2, 2005

(54) SYSTEM AND METHOD FOR ENABLING A WEB SITE ROBOT TRAP

(75) Inventors: Marc Lamberton, Antibes (FR); Eric Levy-Abegnoli, Nice (FR); Pascal Thubert, Vence (FR)

(73) Assignee: International Business Machines Corporation, Armonk, NY (US)

( * ) Notice: Subject to any disclaimer, the term of this patent is extended or adjusted under 35 U.S.C. 154(b) by 346 days.

(21) Appl. No.: 09/950,729

(22) Filed: Sep. 12, 2001

(65) Prior Publication Data

US 2002/0046223 A1 Apr. 18, 2002

(30) Foreign Application Priority Data

Sep. 12, 2000 (EP) .......................................... 00480086

(51) Int. Cl.[7] .............................................. G06F 17/30
(52) U.S. Cl. ................................. 707/9; 707/10; 707/6
(58) Field of Search ............................ 707/9, 3, 10, 6; 713/200, 201

(56) References Cited

U.S. PATENT DOCUMENTS 6,393,479 B1 * 5/2002 Glommen et al. .......... 709/204
6,418,471 B1 * 7/2002 Shelton et al. .............. 709/227
6,574,627 B1 * 6/2003 Bergadano et al. ............ 707/9

OTHER PUBLICATIONS

Erik Schorr, Thwarting the Advances of Internet Robots and Other Pests Jul. 19, 1998, pp. (1–9).*

* cited by examiner

Primary Examiner—Shahid Alam
Assistant Examiner—Cam Y T Truong
(74) Attorney, Agent, or Firm—Rafael Perez-Pineiro; Anne V. Dougherty

(57) ABSTRACT

The invention allows a system to prevent robots from browsing a Web site beyond a welcome page. When an initial request from an undefined originator is received Web site responds to it with a welcome page including at least one trap. Then, on receiving further requests from the undefined originator Web site can check whether a trap is used or not. If not used the undefined originator is assumed to be a human being and is authorized to go on. If a trap is however used the undefined originator is assumed to be a robot in which case site access is further denied. The invention prevents Web site contents from being investigated by robots while not requiring users to have to log on.

12 Claims, 4 Drawing Sheets

SYSTEM AND METHOD FOR ENABLING A WEB SITE ROBOT TRAP

FIELD OF THE INVENTION

The present invention relates to the Internet and more particularly applies to those of the World Wide Web (WWW) sites that, while welcoming human beings, want to exclude robots from visiting and gathering information from them.

BACKGROUND OF THE INVENTION

WWW robots, also called Web Wanderers, Web Crawlers or Web Spiders and often just referred to as bots (bot is short for robot), are programs devised to automatically traverse the hypertext structure of the Web thus, having retrieved a document, can recursively retrieved all the linked pages. Especially, this is the case of the numerous search engines and their robots which roam the World Wide Web finding and indexing content to add to their databases. Although most robots provide a valuable service this has developed a certain amount of concern amongst Web site administrators about exactly how much of their precious server time and bandwidth is being used to service requests from these engines. If the majority of robots are well designed, are professionally operated and cause no problems, there are occasions where robots visiting Web servers are not welcome. Sometimes because of the way robots behave. Some may swamp servers with rapid-fire requests, or retrieve the same files repeatedly. If done intentionally this is a form of Denial of Service (DoS) attack although this is more often just the result of a poor or defective robot design. In other situations robots traverse parts of WWW servers that are not suitable for being searched e.g., contain duplicated or temporary information, include large documents or e.g., CGI scripts (CGI is a standard for running external programs from a World-Wide Web HTTP server). In this latter case and in similar situations, when accessed and executed, scripts tend to consume significant server resources in generating dynamic pages thus, slow down the system. In recognition of these problems many Web robots offer facilities for Web site administrators and content providers to limit what the robot is allowed to do. Two mechanisms are provided. One is referred to as the 'Robots Exclusion Protocol' even though it is not really an enforced protocol but was a working document discussed as an Internet-Draft by the Internet Engineering Task Force (IETF) in 1996 under the title 'A Method for Web Robots Control'. According to this document a Web site administrator can indicate which parts of the site should not be visited by a robot, by providing a specially formatted file, in http:// . . ./robots.txt. The other mechanism assumes that a Web author can indicate if a page may or may not be indexed, or analyzed for links, through the use of a special Hyper Text Markup Language (HTML) META tag i.e., a 'Robots META tag'. However, these mechanisms rely on cooperation from the robots, and are not even guaranteed to work for every robot. Moreover, as already suggested here above (DoS), some of these robots may not be so friendly. They could be run e.g., with the malicious intent of attacking a Web site (then, they just ignore the robots.txt file and the robots meta tags) so as it becomes overloaded and start refusing to serve legitimate users i.e., the human beings trying to use normally the site. Also, although the information made available on a site may not be confidential, an administrator may want to prevent an unlimited dissemination of it that would otherwise result of its indexing and referencing by all sorts of robots. The standard way of achieving this is to protect a Web site through some form of authentication of which the more common method is to manage a list of registered users having a password so as they have to sign on upon accessing the site. The obvious drawback of this is that administrators must manage and update a closed list of users thus, requiring a registration step for a first consultation of a site also, assuming that users remember passwords in subsequent consultations. This may not be at all what administrator wanted to achieve in a first place and may even be counterproductive since it will certainly discouraged some individuals, willing to browse a site, to go further if they are requested to register.

Thus, it is a broad object of the invention to prevent Web site contents from being investigated by robots.

It is a further object of the invention of not discouraging human beings, attempting to access a robot protected Web site, to proceed by imposing a registration at first access and a log on procedure at each subsequent access.

It is still another object of the invention not to rely on robots cooperation for barring them access to contents of Web sites.

Further objects, features and advantages of the present invention will become apparent to the ones skilled in the art upon examination of the following description in reference to the accompanying drawings. It is intended that any additional advantages be incorporated herein.

SUMMARY OF THE INVENTION

A method and a system for preventing robots from browsing a Web site beyond a welcome page are described. On receiving an initial request from an undefined originator Web site responds to it with a welcome page including at least one trap. Then, on receiving further requests from the undefined originator Web site can check whether a trap is used or not. If not used the undefined originator is assumed to be a human being and site keeps processing all its further requests. However, if a trap is used the undefined originator is assumed to be a robot in which case all requests from that originator are not further processed.

The invention prevents Web site contents from being investigated by robots without requiring end users to register and site administrator to have to manage an access list of authorized users.

DETAILED DESCRIPTION OF THE PREFERRED EMBODIMENT

Figures 1A, 1B:
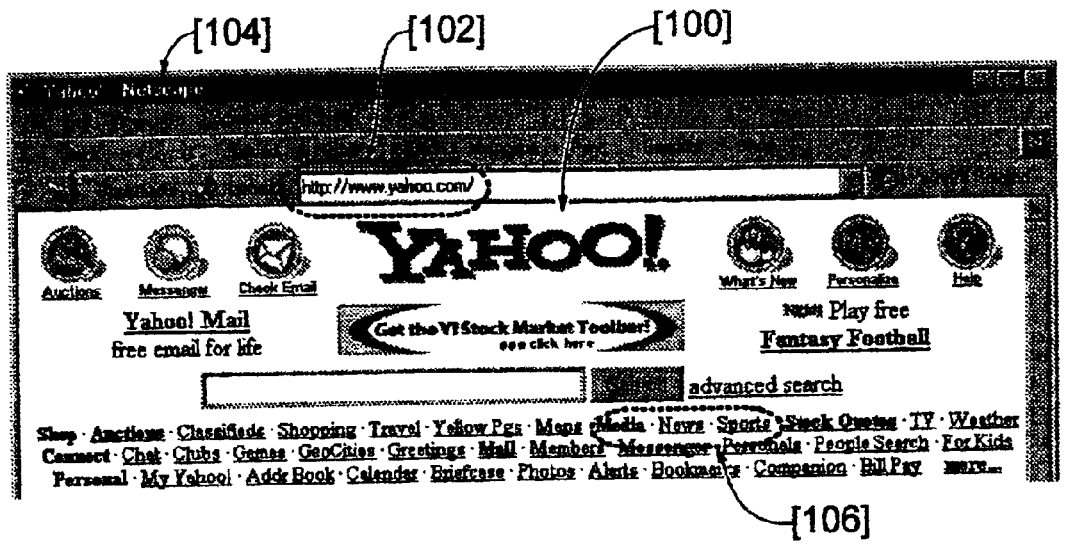
FIG. 1 is a reference Web page used to describe the invention.

FIG. 1 shows the top portion of the welcome page [100] of a well known Web site at http://www.yahoo.com/ [102] of "Yahoo! Inc.", 3420 Central Expressway, Santa Clara, Calif. 95051, the USA. It is displayed here with a standard Web browser or navigator [104] e.g., the one from Netscape Communications Corporation, 501 E. Middlefield Road, Mountain View, Calif. 94043, the USA. Also shown in this figure is a small excerpt [110] of the Hyper Text Markup Language (HTML) code used in the background by the client browser to format and display this particular welcome page [100]. FIG. 1 is used as a reference to illustrate how the invention is carried out. The following description more particularly focuses on a small part [106] of what is displayed and on the corresponding HTML lines of codes [108].

Figures 2A, 2B:
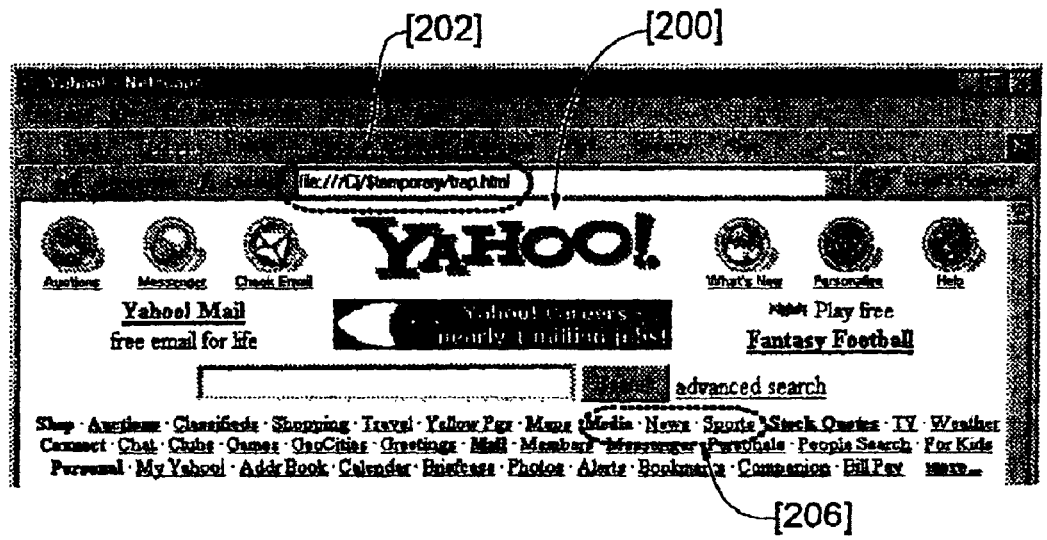
FIG. 2 shows how the reference page can be modified to introduce traps per the invention.

FIG. 2 illustrates the method according to the invention to detect that a robot is attempting to access a site. Then, Web page is devised to contain at least one element which is not visible when displayed by the Web browser so that a human being can not see it thus, cannot act on it. HTML code of the page of FIG. 1, used a reference, is thus altered as shown in [208]. At least one line is added which contains a trap for robots [211]. Links to other documents, such as [210], which shows up in the welcome page in area [206], are of the following general form:

<a href=. .hypertext reference. .>foo</a> where "a", "/a" delimit an "anchor" and "href" introduces a hypertext reference, which may be, among other possibilities, a Uniform Resource Locator (URL) complying with the Request For Comment, RFC1738, of the IETF (Internet Engineering Task Force). The text i.e., "foo" is the label appearing on the link in the browser. Therefore, lines [210] and [212] follow this general syntax. Line [210] thus results in the display of the "News" link and line [212] to the display of the "Sports" link in area [206]. However, line [211], although being a valid anchor too, does not result in the display of anything since the corresponding field [215] is empty. Hence, what is displayed is not different when compared with FIG. 1 in spite of the above change which introduces one extra 'empty' anchor [211] in this particular example. The display of the page [200], here a local copy [202] of the reference page shown in FIG. 1 is thus not altered whatsoever. Especially, the display area [206] corresponding to the change introduced in the HTML code shows up identically.

However, if the change is invisible to a human being it remains well 'visible' by robots since it is the kind of anchor tags that robots go systematically through when visiting a site irrespective of the fact they are actually displayed or not by the client browser. Hence, they will act as a trap for them. In practice, a trap can be carried out in various ways. It can be, as shown in [211], an empty anchor tag i.e., an area within the content of the web page which thus contain the trap i.e., an hyperlink to a specific URL however, as already discussed above, not showing up when page is displayed by a browser. Such an hyperlink may just be a simple reference to a 'trap' page in current Web site [216] rather than a complete URL. A trap can contain as well an invisible image e.g., a one-pixel image on a background of the same color or a transparent image [221] so that, contrary to the simpler format of the trap shown in line [211], it cannot be easily analyzed and detected by a smart robot (robots could be instructed to skip anchors having an empty field to display [215]). Because robots are programmed to fetch every URL they are able to retrieve in a Web page they will eventually reach one of the inserted traps and since this triggers an unexpected action i.e., an action that a human being cannot normally do it will be the clear indication that a robot is indeed attempting to visit the site.

Figure 3:
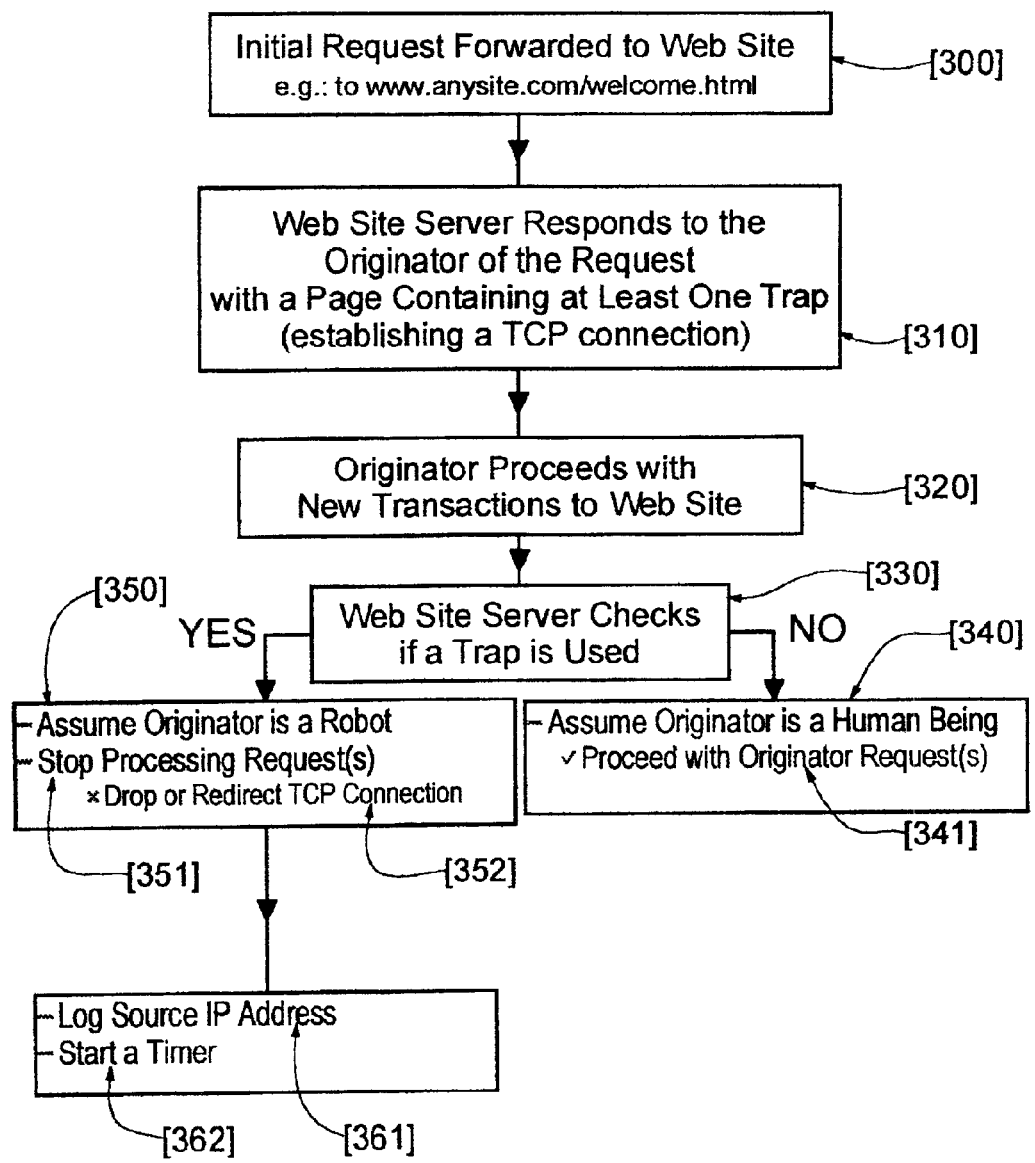
FIG. 3 shows the steps of the method of the invention.

FIG. 3 depicts the steps of the method according to the invention when originator of an initial request to a Web site is responded with a page containing at least one trap. Upon receiving this initial request [300] Web site server responds [310]. This is done through the establishment of a TCP connection with the originator (the reliable transport protocol of the Internet TCP/IP suite of protocols used by the Web). Response is in the form of a Web page including at least one trap of the kind discussed in FIG. 2. Then, having got server response, originator proceeds with new transactions towards the Web site [320]. On receiving each new transaction Web site server checks if a trap is used. If it is not the case [340] then, it assumes that originator is a human being and let it go. However, if Web server finds that a trap is indeed used then, it assumes originator is a robot [350]. Hence, it stops processing current and further requests if any [351], which includes dropping the TCP connection or redirecting it to another site [352]. Also, the IP source address [361] may be remembered and a timer started [362] so that the access to the site may be temporarily barred, from that IP source address, as explained in FIG. 4.

Figure 4:
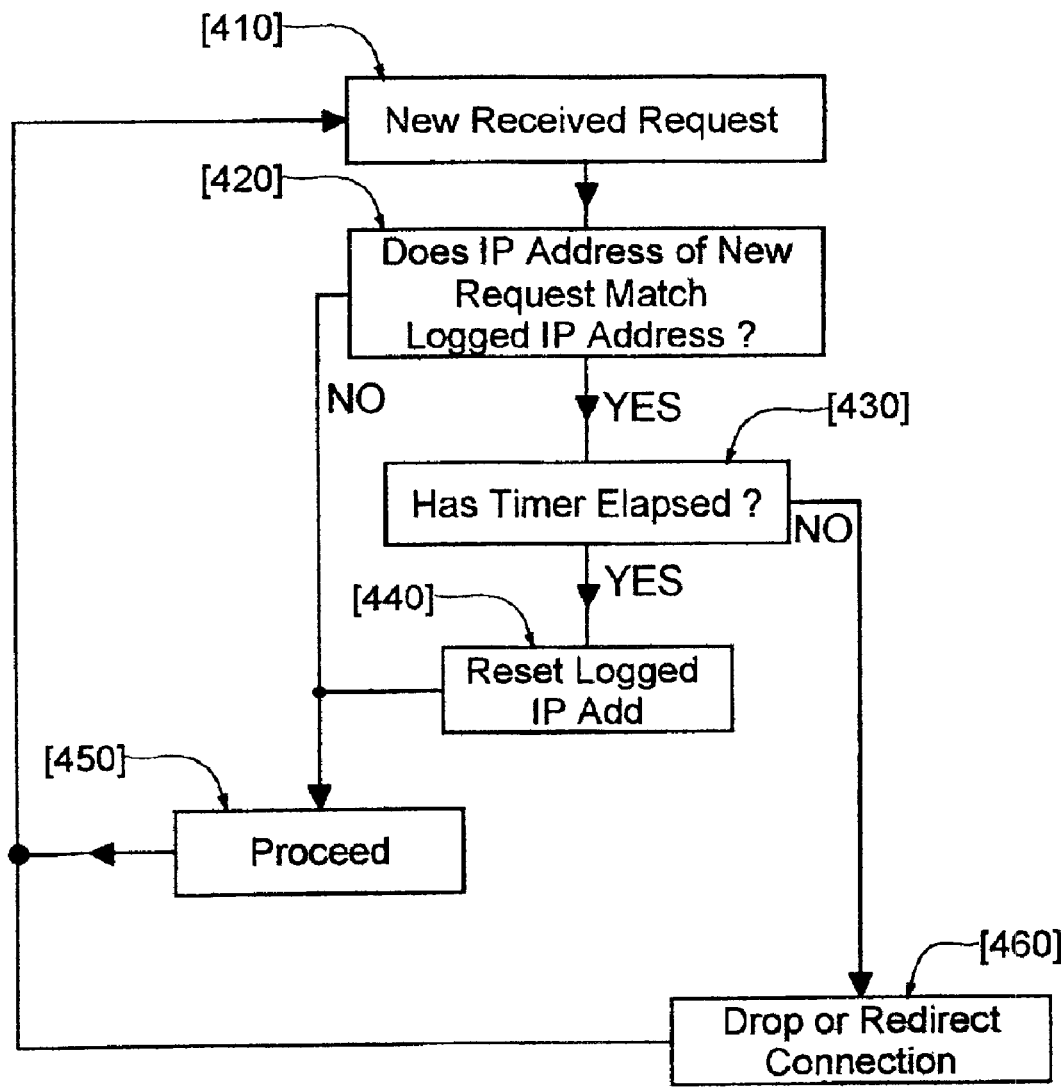
FIG. 4 shows the further steps of the method when access to a Web site per the invention is denied, while a timer is on, for requests carrying a logged IP address.

FIG. 4 shows the case where the IP address of the originator is remembered when a robot is assumed. Then, one may decide, for a while, to drop or redirect immediately all requests issued with this particular source IP address, and all assumed to come from a robot (although this might not always be true since a robot may be behind a proxy or firewall performing a network address translation of all the IP source addresses it has to forward). Because IP source address of the request was logged and a timer started as explained in FIG. 3, each time a new request is received [410] one first checks if the same source IP address is found [420]. If not, one may proceed normally [450]. If yes, timer is checked [430]. If it has elapsed, the logged IP address is reset [440] and new request is normally handled [450]. However, if timer has not elapsed, TCP connection is dropped or redirected [460] before resuming to a new received request [410].

What is claimed is:

1. A method for preventing robots from browsing a Web site beyond a welcome page, said method in said Web site comprising the steps of:
   on receiving an initial request from an undefined originator to establish a session:
      responding to said initial request with a said welcome page including at least one trap;
   dynamically monitoring action by the undefined originator on said at least one trap during said session;
   on receiving further requests from said undefined originator during said session:
      checking whether one of said at least one trap is used or not;
      if not used:
         assuming that said undefined originator is a human being and keep processing said further requests; and
      if used:
         assuming that said undefined originator is a robot and stopping processing of said further requests.

2. The method according to claim 1 further including the steps of:
   logging a source IP address of said undefined originator and starting a timer.

3. The method according to claim 2 further including, whenever receiving a new request, the steps of:
   checking whether a source IP address of said new request is matching said logged source IP address; and
   if matching:
      checking whether said timer has expired or not; and
      if expired:

resetting said logged IP address; and
proceeding normally with said new request;
if not expired:
performing one of dropping and redirecting said TCP connection; and
if not matching:
proceeding normally with said new request; and
repeating said steps with every new received request.

4. The method according to claim 1 wherein said step of stopping processing said further requests includes performing one of dropping and redirecting a TCP connection established with said undefined originator.

5. The method according to claim 1 wherein said trap is an HTML anchor invisible when displayed by a Web browser.

6. The method according to claim 5 wherein said HTML anchor includes an invisible image.

7. The method according to claim 1 wherein every page out of said Web site includes at least one trap.

8. A system for a Web site to implement at least one trap in a Web page for preventing robots from browsing a Web site beyond a welcome page, comprising:
a processor comprising a response component, a trap checking component and processing component;
response component for, on receiving an initial request from an undefined originator to establish a session, responding to said initial request with a welcome page including at least one trap;
trap checking component for, dynamically monitoring action by the undefined originator on said at least one trap during said session, and on receiving further requests from said undefined originator in the same session, checking whether one of said at least one trap is used or not;
processing component for, if said at least one trap is not used, processing said further requests; and if said at least one trap is used, stopping processing of said further requests.

9. The system of claim 8 further comprising logging means for logging a source IP address of said undefined originator and starting a timer.

10. The system of claim 9 wherein said stopping processing by said processing component comprises:
performing one of dropping and redirecting a TCP connection established with said undefined originator.

11. The system according to claim 8 further including means for checking whether a source IP address of said new request is matching said logged source IP address; and
if matching:
checking whether said timer has expired or not; and
if expired:
resetting said logged IP address; and
proceeding normally with said new request;
if not expired:
performing one of dropping and redirecting said TCP connection; and
if not matching:
proceeding normally with said new request; and
repeating said steps with every new received request.

12. A computer like readable medium comprising instructions for carrying out a method for preventing robots from browsing a Web site beyond a welcome page, said method in said Web site comprising the steps of:
on receiving an initial request from an undefined originator to establish a session:
responding to said initial request with a welcome page including at least one trap;
monitoring action by the undefined originator on said at least one trap during said session;
on receiving further requests from said undefined originator in the same session:
checking whether one of said at least one trap is used or not;
if not used:
assuming that said undefined originator is a human being and keep processing said further requests; and
if used:
assuming that said undefined originator is a robot and stopping processing of said further requests.

* * * * *